United States Patent Office 3,454,878
Patented July 8, 1969

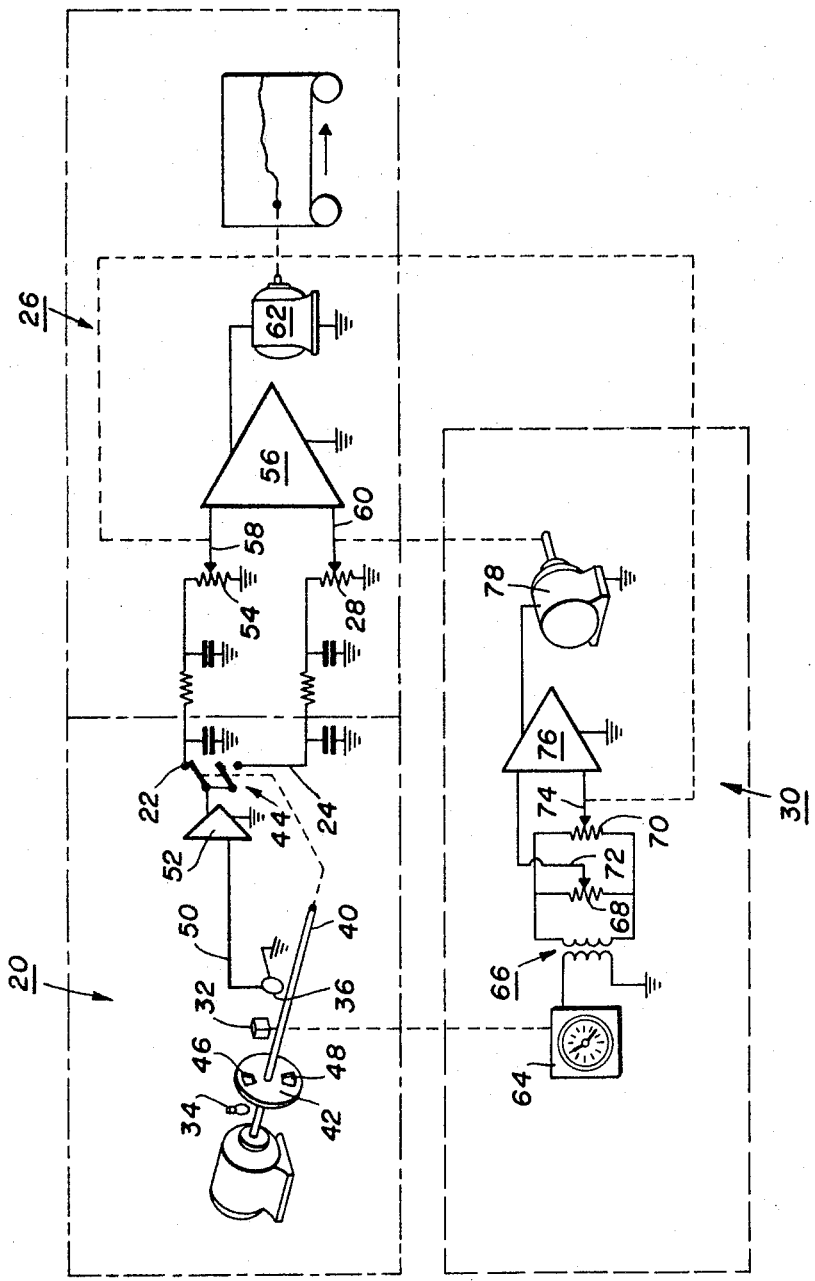

1

3,454,878
RECORDER AUTOMATIC ZERO DRIFT CORRECTION
John W. Hendrix, Jr., and Charles W. Young, Pensacola, Fla., assignors to Monsanto Company, St. Louis, Mo., a corporation of Delaware
Filed Mar. 16, 1967, Ser. No. 623,730
Int. Cl. G01r 17/06
U.S. Cl. 324—99                              2 Claims

ABSTRACT OF THE DISCLOSURE

The reference potentiometer in a recorder having a reference and a signal potentiometer is reset by an additional servo including a comparison and a calibration potentiometer. The comparison potentiometer is mechanically driven with the signal potentiometer, and the signal difference between the taps on the comparison and the calibration potentiometers energizes the additional servo, which adjusts the reference potentiometer.

---

The present invention relates to circuitry for automatically resetting to a control value the reference potentiometer in a recording apparatus. This is accomplished by an additional servo mechanism under the control of a clock or other initiating signal.

In recorders of the type having a servo driven by the difference in amplitude of a signal voltage and a reference voltage on respective potentiometers, and in which the servo motor drives the signal potentiometer in the direction to eliminate the difference in signals and also drives an indicator such as a recording pen, it has been found that the reference voltage drifts from various causes. Ordinarily this requires that the reference potentiometer be manually reset to the proper control value. In some environments this is dangerous and time consuming. According to the present invention, this resetting of the reference potentiometer is accomplished automatically by an additional servo mechanism.

A primary object of the invention is to provide for automatic resetting to a control value the reference potentiometer in a recording instrument. A further object is to provide for resetting the reference potentiometer with a minimum of additional circuit components. A further object is to provide for resetting the reference potentiometer in a manner that is simple, reliable and economical, with no dead band.

Other objects of the invention will in part be obvious and will in part appear hereinafter.

For a more complete understanding of the nature and objects of the invention, reference should be had to the following detailed description taken in connection with the accompanying drawing, in which the single figure is a schematic circuit diagram of the preferred embodiment of the invention.

The preferred embodiment comprises a photometric analyzer 20 for producing signals on conductors 22 and 24, the signals having amplitudes proportional to the values of a variable quantity and to a reference standard, respectively. The differences in amplitudes of these signals represents the value of the variable quantity, and is recorded by recorder 26. The reference standard signal appearing on conductor 24 drifts or changes for various reasons, causing an inaccurate recorded value. Periodically reference potentiometer 28 in recorder 26 is reset by calibration circuitry 30 to compensate for such drift, as will be described.

The preferred exemplary embodiment of analyzer 20 is commercially available as the Model 504 Photo Analyzer sold by Analytic Systems Company, Pasadena, Calif. and

2 accordingly need not be described in detail. Briefly, a sample fluid containing a constituent to be measured and a different constituent of known concentration is fed to and removed from transparent cell 32 by conventional piping and valves (not illustrated). A beam of light from light source 34 passes through cell 32 and strikes photocell 36. Motor 38 drives shaft 40, on which are mounted a rotating disc 42 and a reed switch 44. Disc 42 is interposed between light source 34 and cell 32, and includes filters 46 and 48. These filters selectively pass different wave lengths characteristic of the material to be analyzed and of the reference material of known concentration. Accordingly, light of different wave lengths alternately impinges on photocell 36, producing on conductor 50 alternate output pulses proportional to the concentrations of the material being measured and of the reference material.

The pulses on conductor 50 are amplified by amplifier 52, the output of which is fed to the moving contracts of reed switch 44. Since reed switch 44 is synchronously driven with filters 46 and 48, the signals proportional to the concentration of the sample to be analyzed are fed to conductor 22, while those signals proportional to the reference material of known concentration are fed to conductor 24. These signals are fed through integrating networks to signal potentiometer 54 and reference potentiometer 28, respectively, located in the recorder 26. The signals thus appearing at the ungrounded terminals of potentiometers 28 and 54 are DC signals having amplitudes proportional to the concentrations of the components to which filters 46 and 48 respond. A suitable recorder 26 is commercially available as Model H by Leeds and Northrop. The differential amplifier 56 amplifies the voltage difference between movable tap 58 of potentiometer 54 and movable tap 60 of potentiometer 28, and drives servo motor 62 with the resultant differential signal, which is proportional to the concentration of the constituent to be measured. Servo motor 62 drives movable tap 58 in the direction to reduce to zero the resulting output signal as will be understood by those skilled in the art. The apparatus as thus far described is conventional.

According to the invention, calibration circuitry 30 resets potentiometer 28 to correct for drift in the instrument. Circuitry 30 includes a clock 64 for initiating a calibration cycle by energizing transformer 66 at selected time intervals. Calibration potentiometer 68 and comparison potentiometer 70 are connected in parallel with one another across the secondary winding of transformer 66, and have movable taps 72 and 74, respectively, connected to the input terminals of differential amplifier 76. The output signal of differential amplifier 76 energizes servo motor 78, which drives movable reference tap 60. Calibration tap 72 is manually adjustable, while comparison tap 74 is driven by servo motor 62 in the same sense as is signal tap 58. That is, taps 58 and 74 are driven by motor 62 so that the voltage on both taps either increases or decreases. In addition to enabling motor 78 by energizing transformer 66, clock 64 supplies a signal to introduce into cell 32 a standard fluid of known composition, by way of conventional valves and piping (not illustrated).

During normal operation of the apparatus, calibration circuitry 30 is not energized by clock 64, and analyzer 20 and recorder 26 operated as above described. At selected intervals, clock 64 transfers the standard fluid into cell 32 and energizes transformer 66. The standard fluid may be assumed for purposes of illustration to contain 30% acrylonitrile in a solvent. During the initial adjustment, calibration tap 72 is then manually adjusted until the pen on the recorder indicates 30%. After the initial adjustment, tap 72 need not be further adjusted, and calibration circuitry 30 will automatically reset tap 60 to the correct value in the following manner.

Assuming that the voltage on tap 60 has drifted to a value lower than the assumed correct value, taps 58 and 74 will have been driven by motor 62 to corresponding incorrect lower positions. When clock 64 introduces the standard fluid into chamber 32 and energizes transformer 66, an error signal appears across taps 72 and 74 and is amplified by amplifier 76. This error signal is of the proper phase to drive motor 78 and tap 60 in the direction to increase the voltage on tap 60. This unbalances the input signal to differential amplifier 56, driving motor 62 in the direction to increase the voltage on each of taps 58 and 74. When the voltages on taps 72 and 74 become equal, motors 62 and 78 become de-energized, and tap 60 will be located at the proper point on potentiometer 28. Similar operation occurs if tap 60 is positioned too high on potentiometer when the calibration cycle is started by clock 64. At the end of the calibration cycle, clock 64 de-energizes transformer 66, removes the standard solution from cell 32, and restores the instrument to normal operation monitoring the sample fluid.

Although the invention has been described in a recorder wherein the unknown signal is introduced on conductor 22 and the reference standard signal appears on conductor 24, successful operation can be obtained if the reference standard signal is applied to conductor 22 and the unknown signal is applied to conductor 24. Various other modifications will occur to those skilled in the art, such as interrupting the field windings of servo 78 by clock 64 in order to insure that servo 78 remains inoperative during normal operation of the recorder.

Having described our invention, what we claim as new and desire to secure by Letters Patent is:

1. In a recorder, comprising:
   analyzer means for producing first and second signals proportional respectively to the values of a variable quantity and a reference standard,
   means for applying one of said signals across a first potentiometer having thereon a movable first tap,
   means for applying the other of said signals across a second potentiometer having thereon a movable second tap,
   first servo means, responsive to the amplitude difference between the signals on said first and said second taps, for driving said first tap in the direction to reduce to zero said amplitude difference, and
   means for indicating the position of said first servo mechansim,
   the combination therewith of:
   (a) a calibration potentiometer having thereon a movable calibration tap,
   (b) a comparison potentiomter having thereon a movable comparison tap driven by said first servo mechanism in the same sense as said first tap,
   (c) second servo means, responsive when enabled to the amplitude difference between the signals on said comparison tap and said calibration tap, for driving said second tap in the direction to reduce to zero the difference in signal amplitude between the signals on said calibration tap and said comparison tap, and
   (d) control means for selectively enabling said second servo mechanism.

2. The recorder defined in claim 1, wherein said first signal is applied to said first tap.

References Cited

UNITED STATES PATENTS

| | | | |
|---|---|---|---|
| 2,527,207 | 10/1950 | Barnes | 318—20.751 |
| 2,734,949 | 2/1956 | Berry | 324—130XR |
| 3,348,046 | 10/1967 | Lloyd | 318—20.751 |
| 3,359,410 | 12/1967 | Frisby et al. | 330—9XR |

RUDOLPH V. ROLINEC, *Primary Examiner.*

ERNEST F. KARLSEN, *Assistant Examiner.*

U.S. Cl. X.R.

324—130